Jan. 8, 1957 R. P. DELANO 2,776,859
AUTOMOBILE VISOR
Filed July 22, 195

INVENTOR.
RICHARD P. DELANO
BY Albert Sperry
ATTORNEY

United States Patent Office 2,776,859
Patented Jan. 8, 1957

2,776,859

AUTOMOBILE VISOR

Richard P. Delano, Setauket, N. Y.

Application July 22, 1954, Serial No. 445,105

1 Claim. (Cl. 296—97)

This invention relates to automobile visors and is particularly directed to a novel visor which protects the occupants from the glare of street lights or the headlights of approaching vehicles while driving at night.

Most, if not all, modern automobiles are equipped with visors of some sort which are intended to protect the occupants of the vehicle from being blinded by the glare of the sun. The vast majority of these visors, however, are opaque. Consequently, while they may be useful in shading the occupants' eyes from the sun, they provide little or no protection against strong lights which are located directly in front of the automobile, such as street lights and the headlights of approaching vehicles. It is common knowledge that these lights are quite bothersome, and, particularly during night driving, they are often so intense as to temporarily blind the driver, frequently resulting in serious or fatal accidents.

Numerous suggestions have been made previously to overcome this situation. However, none of these has been entirely satisfactory. The most common attempt is to provide a transparent visor which may be added or substituted for the opaque sun visor which is the usual standard equipment on the car. However, where such visors are uniformly tinted, they cannot take care of the great changes in intensity as a light approaches the car. Moreover, most of these visors decrease the driver's visibility of the road.

These disadvantages of prior art devices are overcome with the present invention and a visor is provided which may be readily installed and which provides ample protection against oncoming lights up to and including the point where they pass out of the driver's range of vision while allowing full visibility of the road at all times. In addition, the visor of the present invention affords protection for the driver against lights approaching from the side, as in the case of a car coming down a side street.

The advantages of the present invention are preferably attained by providing a visor which is generally L-shaped and which is tinted gradually deeper shades adjacent the upper and left edges thereof. Furthermore, the ends of the visor are preferably curved inwardly toward the driver through an angle of from 10 to 90 degrees so that the driver is fully protected against lights passing the car on either side. In addition, the visor may be provided with pivotal clips adjacent the upper edges thereof whereby the visor may easily be fastened to the sun visor which is standard equipment in most automobiles, thus permitting the visor to be moved out of the way when not in use. If desired, a handle may be provided to facilitate adjustment of the visor and to avoid the necessity of touching the visor itself which leaves smudges and fingerprints on the visor and, consequently, reduces visibility.

Accordingly, it is an object of the present invention to provide a visor for use in automobiles which will provide adequate protection against oncoming lights up to and including the point where the light passes out of the occupants' range of vision while allowing full visibility of the road at all times.

Another object of the invention is to provide a visor for use in automobiles which affords protection against lights approaching from the side and which is simple to install and can readily be moved out of the way when not needed.

A specific object of the present invention is to provide a visor for use in automobiles which is generally L-shaped with the ends thereof curved inwardly and which is tinted gradually deeper shades adjacent the upper and left edges thereof.

These and other objects and features of the present invention will be apparent from the following description thereof taken in connection with the figures of the accompanying drawing.

Figure 1:
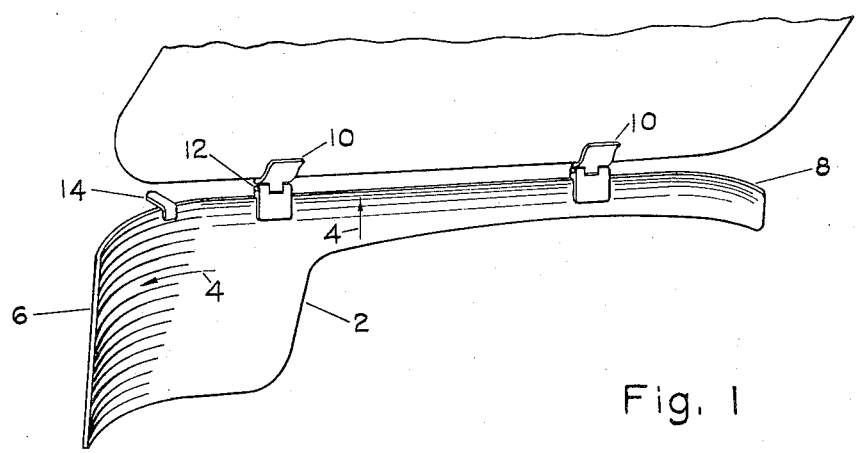
Fig. 1 is a perspective of a typical visor embodying the present invention.
Figure 2:
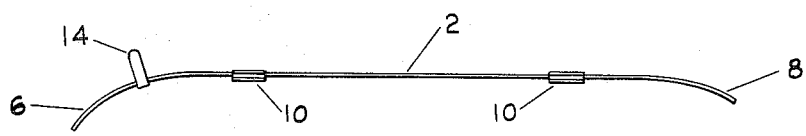
Fig. 2 is a plan view of the visor of Fig. 1.

In that form of the invention chosen for purposes of illustration in the drawing, the visor is shown as comprising a generally L-shaped sheet 2 of transparent material having an enlarged portion adjacent the left end thereof. Thus, the central area directly in front of the driver is unobstructed to provide maximum visibility at all times while the fringe areas above and to the left of the central area are protected. The sheet 2 is preferably tinted to reduce the intensity of light passing through the visor with the shading becoming gradually deeper adjacent the upper and left edges of the visor as indicated by arrows 4. In this way, as a light approaches nearer to the car, it must pass through increasingly darker shading so that the amount of light reaching the driver's eye will be approximately constant at all times. Furthermore, as seen in Fig. 2, the ends 6 and 8 of the sheet 2 are curved or bent inwardly through an angle of from 10 to 90 degrees. With this construction, lights passing the car or approaching from the side must still pass through the visor before reaching the driver's eyes. Consequently, there can be no sudden bright flashes of light from the side to startle the driver. While both ends 6 and 8 of the visor are shown, in Fig. 2, as being curved, if desired, only end 6 need be curved. In any event, since the driver's range of vision is greater on the left side of the car, end 6 is preferably curved or bent through a greater angle than end 8. Furthermore, this curved shape has an additional advantage in modern cars wherein the windshield is curved. With prior art straight visors, if the windshield is curved, the visor cannot be positioned closely adjacent the windshield but must be placed farther back toward the driver and may sometimes be so close to the driver that it will annoy him while driving. On the other hand, the curved visor of the present invention may be placed as close to the windshield as desired, and consequently, this source of irritation is eliminated.

The visor of the present invention may, of course, be secured in place in any desired manner. For example, the visor 2 may be provided at spaced points adjacent the upper edges thereof with fastening means, such as spring clips 10, whereby the visor may easily be snapped onto the lower edge of the customary sun visor. Preferably, the spring clips 10 should be of the type which are pivotal about a pin 12 to permit the visor to be moved out of the way when not in use or when it is desired to use the sun visor instead. In addition, a handle 14 may be provided to facilitate adjustment of the visor. If desired, the standard sun visor may be removed and the present visor substituted therefor. However, since the present visor is designed to protect the driver against the glare of oncoming lights encountered during night driving, it does not serve the same purpose as the sun visor and is intended to supplement rather than replace the sun visor.

The specific securing means shown is not essential to the invention. For example, clamps may be used or the visor may be more permanently attached as by bolts or rivets. Also, the number and location of the securing means may be varied as necessary or desirable. In addition, the handle may be modified or eliminated. Moreover, for ease in manufacturing, it is contemplated that the visor could be formed of a generally rectangular sheet of material having the central area clear and the upper and left edges of the sheet tinted increasingly deeper shades and formed with the opposite ends of the sheet curved inwardly as described above. Numerous other changes and modifications may obviously be made without departing from the invention. Therefore, it should be clearly understood that that form of the invention described above and shown in the figures of the accompanying drawing is intended to be illustrative only and is not intended to limit the scope of the invention.

What I claim is:

Means for attachment to the standard sun visor of an automobile to protect the driver against the glare of oncoming lights during night driving, said means comprising a generally L-shaped sheet of transparent material having a narrow portion extending across the entire width of the standard sun visor above the driver's line of direct vision to protect against approaching overhead lights and a portion of increased area adjacent the left end of said sheet, said sheet being tinted and having gradually deeper shades of tinting adjacent the upper and left edges thereof, the ends of said sheet being curved inwardly through an angle greater than ten degrees to protect against lights passing the sides of the automobile, hinged spring clips releasably attaching said means to the standard sun visor, and a handle connected to said means for adjusting the position of said means.

References Cited in the file of this patent

UNITED STATES PATENTS

| | | |
|---|---|---|
| 1,534,487 | Banks | Apr. 21, 1925 |
| 1,894,233 | Ellis | Jan. 10, 1933 |
| 2,112,726 | Kemp et al. | Mar. 29, 1938 |
| 2,118,198 | Hathaway | May 24, 1938 |
| 2,220,429 | Soderberg | Nov. 5, 1940 |
| 2,233,739 | Gutierrez | Mar. 4, 1941 |

FOREIGN PATENTS

| | | |
|---|---|---|
| 680,758 | Great Britain | Oct. 8, 1952 |
| 111,056 | Switzerland | July 16, 1925 |